(12) United States Patent
Hazim et al.

(10) Patent No.: US 10,006,536 B2
(45) Date of Patent: Jun. 26, 2018

(54) V-RIBBED BELT AND METHOD FOR SHOWING A WEAR STATE OF A V-RIBBED BELT

(71) Applicant: ARNTZ BETEILIGUNGS GMBH & CO. KG, Hoexter (DE)

(72) Inventors: Salem Hazim, Hoexter (DE); Willi Ollenborger, Bevern (DE)

(73) Assignee: ARNTZ BETEILUNGS GMBH & CO. KG, Hoexter (DE)

( * ) Notice: Subject to any disclaimer, the term of this patent is extended or adjusted under 35 U.S.C. 154(b) by 0 days. days.

(21) Appl. No.: 15/125,633

(22) PCT Filed: Feb. 12, 2015

(86) PCT No.: PCT/DE2015/000074
§ 371 (c)(1),
(2) Date: Sep. 13, 2016

(87) PCT Pub. No.: WO2015/135516
PCT Pub. Date: Sep. 17, 2015

(65) Prior Publication Data
US 2017/0002917 A1 Jan. 5, 2017

(30) Foreign Application Priority Data
Mar. 13, 2014 (DE) .......... 10 2014 003 564

(51) Int. Cl.
*F16G 1/00* (2006.01)
*F16G 5/00* (2006.01)
(Continued)

(52) U.S. Cl.
CPC .............. *F16H 57/01* (2013.01); *F16G 5/06* (2013.01); *F16G 5/20* (2013.01); *F16H 2057/014* (2013.01)

(58) Field of Classification Search
CPC ..... F16G 5/20; F16G 5/06; F16G 1/28; B29D 29/10; B29D 29/103
(Continued)

(56) References Cited

U.S. PATENT DOCUMENTS 3,839,116 A * 10/1974 Thomas ................ B29D 29/10
156/138
4,027,545 A * 6/1977 White, Jr. ............. B29D 29/10
156/138
(Continued)

FOREIGN PATENT DOCUMENTS

CN 1272862 A 11/2000
CN 1671978 A 9/2005
(Continued)

*Primary Examiner* — Henry Y Liu
(74) *Attorney, Agent, or Firm* — Whitham, Curtis & Cook, P.C.

(57) ABSTRACT

For showing a wear state of a V-ribbed belt, which is constructed with a belt backing (1), a tension strand (2) arranged underneath the belt backing and a carcass (4), in which there are formed, in the longitudinal direction of the V-ribbed belt, V-ribs (7) which run parallel to one another, have in each case an interspace (8) with respect to one another and have inclined rib flanks (12), wherein the interspaces (8), formed for the engagement of pulley ribs (11) of a V-belt pulley (10), between two V-ribs (7) of the V-ribbed belt extend as far as a rib base (9) of the V-ribs (7), according to the invention a removal of material in the rib base (9) is detected as a criterion for the wear state.

5 Claims, 1 Drawing Sheet

Figure 1:
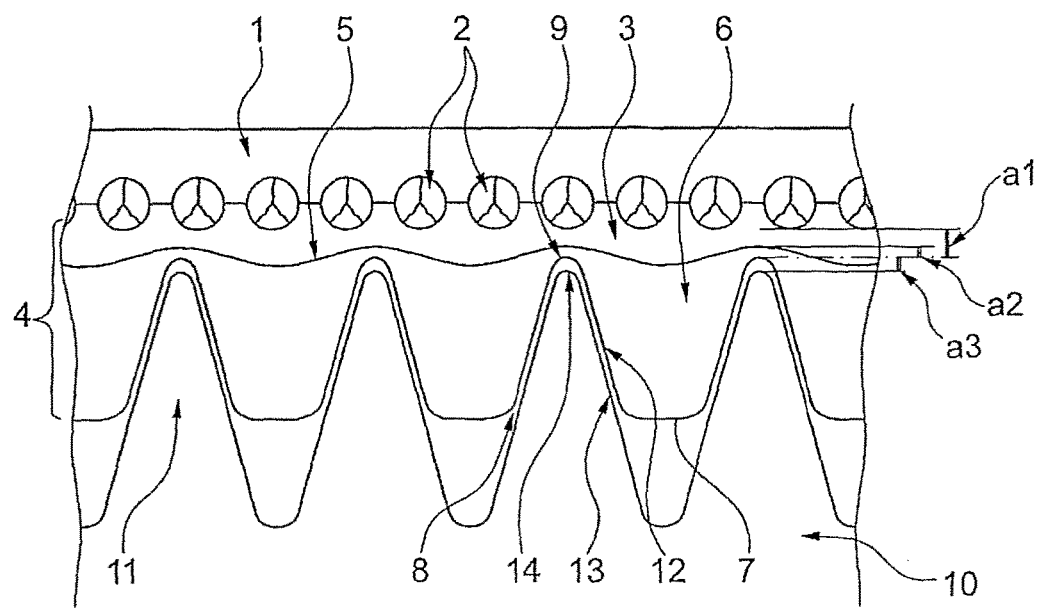

(51) Int. Cl.
*F16G 9/00* (2006.01)
*F16H 57/01* (2012.01)
*F16G 5/20* (2006.01)
*F16G 5/06* (2006.01)

(58) Field of Classification Search
USPC .......................................................... 474/260
See application file for complete search history.

(56) References Cited

U.S. PATENT DOCUMENTS

| | | | | | |
|---|---|---|---|---|---|
| 4,047,446 | A | * | 9/1977 | Speer | F16G 1/04 474/238 |
| 4,283,455 | A | * | 8/1981 | McGee | B29D 29/10 427/289 |
| 4,657,526 | A | * | 4/1987 | Tangorra | F16G 5/06 474/261 |
| 4,892,510 | A | * | 1/1990 | Matsuoka | F16G 5/20 156/138 |
| 6,561,937 | B1 | * | 5/2003 | Wegele | F16G 1/08 474/263 |
| 6,669,592 | B2 | * | 12/2003 | Hayashi | F16G 5/20 474/260 |
| 7,137,918 | B2 | * | 11/2006 | Nonnast | F16G 5/20 156/137 |
| 8,197,372 | B2 | * | 6/2012 | Wu | F16G 1/28 474/260 |
| 8,235,852 | B2 | * | 8/2012 | Hineno | F16G 5/06 474/263 |
| 8,475,310 | B2 | * | 7/2013 | Shiriike | F16G 5/20 474/238 |
| 9,194,458 | B2 | * | 11/2015 | Furukawa | F16G 5/20 |
| 9,341,234 | B2 | * | 5/2016 | Shiriike | F16G 5/20 |
| 2003/0139242 | A1 | * | 7/2003 | Teves | F16G 1/06 474/263 |
| 2004/0048708 | A1 | * | 3/2004 | Nonnast | F16G 5/20 474/260 |
| 2012/0295748 | A1 | * | 11/2012 | Shiriike | F16G 5/20 474/148 |
| 2015/0204425 | A1 | * | 7/2015 | Lindsay | F16H 7/14 474/117 |
| 2015/0280514 | A1 | * | 10/2015 | Norris | H02K 5/26 474/115 |

FOREIGN PATENT DOCUMENTS

| | | |
|---|---|---|
| DE | 30 09 468 A1 | 9/1980 |
| DE | 90 17 776.2 U1 | 2/1992 |
| DE | 10 2006 007 509 A1 | 8/2007 |
| EP | 1 241 379 A1 | 9/2002 |
| EP | 2 175 163 A1 | 7/2008 |
| EP | 2 128 486 A2 | 5/2009 |
| EP | 2469 123 A2 | 6/2012 |
| JP | 109345 A | 1/1998 |
| JP | 2004239314 A | 8/2004 |
| WO | 2004/018900 A1 | 3/2004 |

* cited by examiner

V-RIBBED BELT AND METHOD FOR SHOWING A WEAR STATE OF A V-RIBBED BELT

The invention relates to a method for showing a wear state on a V-ribbed belt which is constructed from a belt backing, a tension strand which is disposed below the belt backing, and an underside in which are configured V-ribs, having oblique rib flanks, which in the longitudinal direction of the V-ribbed belt run mutually parallel and which each have a mutual intermediate space, wherein the intermediate spaces which are configured for the engagement of pulley ribs of a V-rib pulley between two V ribs of the V-ribbed belt extend up to a rib base of the V-ribs.

The invention furthermore relates to a V-ribbed belt constructed having a belt backing, a tension strand which is disposed below the belt backing, and an underside in which are configured V-ribs, having oblique rib flanks, which in the longitudinal direction of the V-ribbed belt run mutually parallel and which each have a mutual intermediate space, wherein the intermediate spaces which are configured for the engagement of pulley ribs of a V-rib pulley between two V-ribs of the V-ribbed belt extend up to the rib base of the V-ribs.

V-ribbed belts are configured for transmitting a drive force to a V-rib pulley. The V-ribbed belt has V-ribs which run in the longitudinal direction, the conical shape of the latter being determined by oblique rib flanks. Rib flanks of two V-ribs disposed so as to be mutually adjacent form a wedge-shaped intermediate space in which the pulley ribs of a V-rib pulley in the fitted state protrude. Driving the V-rib pulley is performed by frictional engagement that is performed exclusively by way of the rib flanks which bear on respective flanks of the pulley ribs. The V-ribs of the V-ribbed belt herein in relation to the pulley grooves which are configured between the pulley ribs are somewhat oversized, so as to implement lateral bearing of the V-ribs of the V-ribbed belt on the pulley ribs of the V-rib pulley under pretensioning, on account of which the transmission of force is ensured by way of the friction.

The V-ribbed belts to which the present invention relates may be configured in various embodiments. In this way, V-ribbed belts which have a smooth belt backing are known. The tension strand, which may be formed from stranded textile strands, high tensile-strength plastics threads, or else steel threads, which run in the longitudinal direction of the V-ribbed belt, can be configured ranging from being very resistant to extension to being elastic, in order to satisfy various application cases. The underside, in which the V-ribs are configured must be composed of an elastic material which is highly resistant to the V-ribs being forcibly pressed into the grooves of the V-rib pulley.

Even if the underside of the V-ribbed belts is composed of a highly resistant material, abrasion in the region of the rib flanks does of course take place during permanent use of the V-ribbed belt, the width of the V-ribs of the V-ribbed belt being reduced by said abrasion. An ongoing reduction in the width of the V-ribs leads to a reduction in the contact pressure of the lateral rib flanks on the respective flanks of the pulley ribs, so that the targeted force transmission with as little slippage as possible is no longer guaranteed.

Checking the state of the V-ribbed belt after a certain operating period is performed in a known manner by way of V-rib gauges which are manufactured for each type of V-ribbed belt and which approximately correspond to the configuration of the pulley ribs of the V-rib pulley, so that upon introduction of the gauge into the intermediate spaces between the V-ribs of the V-ribbed belt it is possible to feel whether an as yet sufficient lateral contact pressure is exerted on the pulley ribs of the V-rib pulley via the rib flanks of the V-ribbed belt. This method is subjective by necessity, and requires significant experience by the person judging the usability of the used V-ribbed belts. It is self-evident that only an approximate qualitative judgement is possible in this manner, so that V-ribbed belts are often replaced for safety reasons long before this replacement is actually required. Moreover, it is problematic in many cases for the quality of the V-ribbed belt to be tested in the fitted state of the V-ribbed belt, using a corresponding V-rib gauge. In many cases, the space required therefor is not available in the installed state, so that the respective test is omitted, or a complex removal of the V-ribbed belt is required.

The present invention is thus based on the object of being able to check the wear state of the V-ribbed belt also in the installed state.

This is achieved in the case of a method of the mentions at the outset according to the invention in that a removal of material in the rib base is detected as a criterion for the wear state.

According to the invention, therefore, a removal of material (wear) is not detected on the rib flanks, but it is seen as a criterion for a wear state requiring the replacement that a removal of material is performed on the rib base. To this end the fact that the wedge-shaped configuration of the V-ribs enables compensation for a removal of material on the rib flanks in that the wedge-shaped pulley ribs of the V-rib pulley plunge somewhat deeper into the likewise wedge-shaped intermediate spaces between the V-ribs of the V-ribbed belt is relevant. This amplified plunging is usually established by regular checking of the belt tension in the fitted state and respective re-tensioning of the V-ribbed belt. Alternatively, the V-ribbed belt is installed such that a specific belt tension is ensured during the operational period by way of an elastically suspended tension roller. It is furthermore known for V-ribbed belts to be configured having elastic tension strands, so that fitting of the V-ribbed belt may be performed under longitudinal pretensioning that may compensate for the potential removal of material during the running period of the V-ribbed belt.

The present invention is based on the insight that a non-compensatable unserviceability of the V-ribbed belt is present when the tips of the pulley ribs of the V-rib pulleys are supported on the base of the groove of the intermediate spaces of the V-ribbed belt. In this case, radial adjustment of the V-ribbed belt in relation to the V-rib pulley which is wrapped by the V-ribbed belt is no longer possible, or possible only in a very minor manner, so that the contact pressure of the oblique rib flanks of the V-ribs on the respective flanks of the pulley ribs may no longer be performed with the required pretensioning. Thus, when the tips of the pulley ribs run on the respective base of the groove of the V-ribbed belt for a certain time, a removal of material is created there. The latter is detected according to the invention so as to detect a wear state that indicates the replacement of the V-ribbed belt.

In a very simple manner, detection succeeds visually in that the surface in the rib base is formed by a first material, and a second visually different material is disposed therebelow, and the visually identifiable exposure of the second material is utilized as the criterion for the wear state. In a particularly expedient manner, the second material is designed in a color that is different from that of the first material.

Thus, when the first material in the usual manner has a black or gray hue, the second material located therebelow may be colored using a distinct color, for example red. A red color which then is identifiable on the rib base shows the wear state that makes immediate or at least early replacement of the V-ribbed belt appear advisable.

Bearing of the tip of the pulley ribs on the rib base typically does not lead to the transmission of force by way of the belt being immediately compromised, because the tip of the V-ribs may still be slightly impressed into the typically elastic material of the underside of the V-ribbed belt before the resistance to further impression becomes so large that re-tensioning of the V-ribbed belt may no longer be performed to the extent that the envisaged contact pressure on the rib flanks is maintained.

It can be derived therefrom that it depends on the size of the ribs and on the rib profiles as to what contact of the pulley rib tip on the rib base may still be tolerated. Accordingly, the thicknesses of the second material in the region of the rib base may be between a minimum thickness which is approx. 0.1 mm, and a thickness of 2 mm. It is expedient for many V-ribbed belt types for the visual warning signal to be indicated already in the case of slight contact between the pulley rib tip and the rib base of the V-ribbed belt. In this case, that layer of the second material on the rib base that covers the first material is minimal and needs only to be so thick that the visually different first layer on the rib base is not identifiable. To this end, the second layer obviously does not have to completely cover the first layer, since a predominant coverage may already lead to the identification capability of the first layer being suppressed.

According to the invention, a V-ribbed belt of the type mentioned at the outset, suitable for the method according to the invention to be carried out, is characterized in that the underside is composed of at least one first material and of one second material, in that the surfaces of the rib flanks of the V-ribs are formed by the second material, in that the first material in the region of the rib base is covered with a thin layer of the second material such that in the case of a removal of material on the underside the first material in the rib base is exposed while the surface of the rib flanks is furthermore formed by the second material, and in that the first material visually differs significantly from the second material.

In one preferred embodiment, the two materials differ in color, wherein the second material may be black or gray, while the first material which is covered by the second material preferably has a solid, easily identifiable color. For enhanced visibility, the color herein may be configured as a fluorescent color.

The first material adjoins the tension strand which may be embedded in a suitable material, and thus initially forms a substantially planar layer. The latter may extend to the second layer in the region of the rib base, so that the barrier layer between the first material and the second material extends across the width of the belt and not into the ribs. Alternatively, it is possible that the first material also extends into the region of the ribs and thus configures a rib core which is covered by the second material. The thickness of the covering ply of the second material in the region of the rib flanks herein is substantially larger than in the region of the rib base.

Specifically, the thickness of the second material in the region of the rib base, that is to say above the first material, may be between 0.1 and 2 mm. The thickness of the layer of the first material above the rib base, that is to say the thickness of the first material between that barrier plane of the tension strand that points toward the ribs, and a barrier line toward the second material is between 0.1 and 2.5 mm for preferred exemplary embodiments.

The V-ribbed belt according to the invention may be configured in all known embodiments, that is to say in particular also as a non-elastic or elastic V-ribbed belt. Moreover, the belt backing may also be provided with a further rib or with a toothing having successive teeth disposed in the running direction, so as to enable alternating wrapping of a V-rib pulley and a crown gear, as is known in principle.

Manufacturing of the V-ribbed belt according to the invention is performed in a known manner. If natural rubber or synthetic rubber is used as a material, vulcanizing may be performed conjointly with shaping (molding method) or prior to shaping, if the shape is subsequently manufactured by a grinding method. The V-ribbed belt according to the invention is also extrudable in the final shape thereof. Beyond the usual elastomers, plastics such as polyurethane, for example, may also be considered as a material of the V-ribbed belt.

Figure 2:
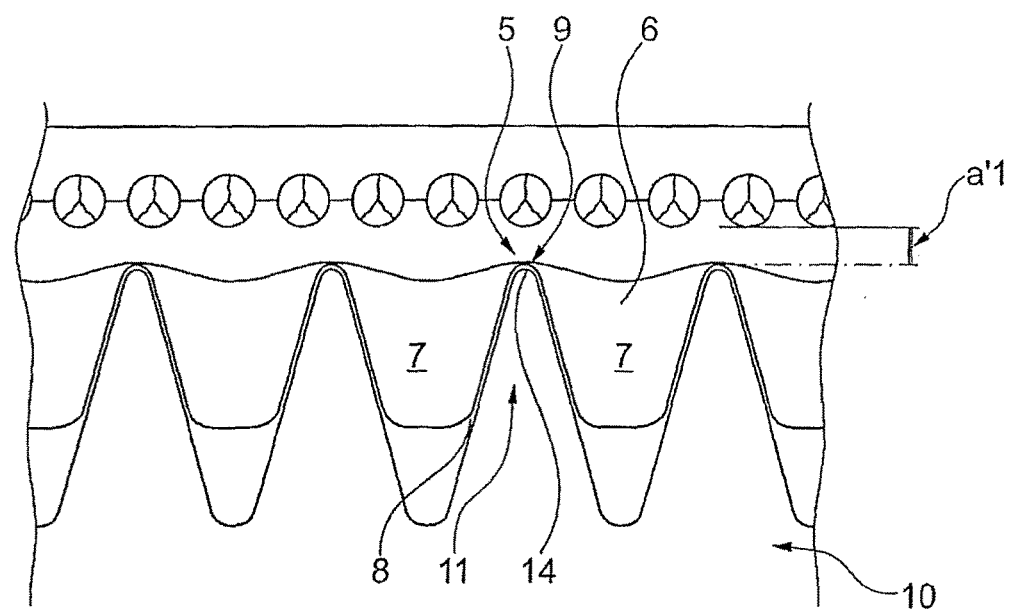

The invention is to be explained in more detail hereunder by means of exemplary embodiments which are described as potential embodiments and are not intended to have any function limiting the scope of the invention. In the drawing:

FIG. 1 shows a section through a V-ribbed belt according to the invention, in a first embodiment in the new state; and FIG. 2 shows a section according to FIG. 2, for the V-ribbed belt in the worn state.

In the exemplary embodiment illustrated, the V-ribbed belt has a smooth belt backing 1 which forms a smooth surface that points outward. A tension strand 2, which is formed from tension cables which are disposed beside one another, adjoins the other face of the belt backing 1. The tension strand 2 may be embedded in a suitable, preferably adhesive plastics material in the usual manner. A layer of a first material 3 of an underside 4 of the V-ribbed belt adjoins the tension strand, so as to face away from the belt backing 1. The layer of the first material 3 is applied to a constant thickness onto a blank sleeve, so that a straight barrier line 5 per se toward a second material 6 is formed. The first material 3 and the second material 6 may also be applied onto the blank sleeve (belt backing 1 and tension strand 2) as a two-ply material having the required thickness ratios. In the exemplary embodiment illustrated, the shaping of the underside has been performed by molding, on account of which the barrier line 5 is deformed somewhat in an undulated manner. V-ribs 7 having the intermediate spaces 8 lying therebetween are configured from the second material 6 during molding. The intermediate spaces 8 extend to a rib base 9. The rib base 9 in the illustrated exemplary embodiment is located entirely within the second material 6 which in the region of the rib base 9 covers the first material 3 by way of a thin layer having an indicated thickness a2.

In one preferred exemplary embodiment, the first material 3 is composed of a colored, in particular red, EPDM (ethylene propylene diene rubber), while the second material may be formed from a usual black EPDM rubber.

The drawing elucidates that the V-ribbed belt in use interacts with a respective V-rib pulley 10. The V-rib pulley 10 has pulley ribs 11 which protrude into the intermediate spaces 8 between two V-ribs 7 such that a lateral rib flank 12 of the V-rib 7 comes to bear in a planar manner under a lateral pretensioning on a lateral flank 13 of the adjacent pulley rib 11. The two lateral flanks 13 of one pulley rib 11 bear on the rib flanks 12 of the two adjacent V-ribs 7 such that a tip 14 of the pulley rib 11 terminates at a spacing from the rib base 9. The spacing that exists in the new state of the V-ribbed belt between the tip 14 and the rib base 9 is indicated in FIG. 1 as the dimension a3.

The dimension a1, which is likewise indicated, elucidates the thickness of the first material 3 between the tension strand 2 and the barrier line 5 in the region of the respective rib base 9.

It can be seen from FIG. 1, which elucidates the new state of the V-ribbed belt, that only the second material which is colored black, for example, can be seen from the V-ribbed belt in a plan view as viewed from the side of the V-ribs 7.

FIG. 2 elucidates a wear state which can be seen on the V-ribbed belt according to the invention. By way of a removal of material on the rib flanks 12, and of automatic or manual re-tensioning of the V-ribbed belt about the V-rib pulley 10, the pulley ribs 11 now engage more deeply into the intermediate space 8 between two V-ribs 7. In the worn state illustrated in FIG. 2, the tip 14 of the pulley ribs 11 contacts the rib base 9, having removed material from the latter. The removal of material has progressed such that none of the second material 6 is present in the region of the rib base 9 anymore, so that first material 5 which is colored red, for example, is exposed in the region of the rib base 9. In a plan view of the V-ribbed belt in a region that has left behind the wrapping of the V-rib pulley 10, the black material now remains visible in the region of the V-ribs 7, while the first material, for example in a red color, becomes visible in the rib base 9. The V-ribbed belt in this view thus has a black surface, having thin red stripes in each case in the rib base 9. This view signals that the V-ribbed belt has reached a wear state in which the former is to be replaced immediately or soon, because the rib flanks 12 of the V-ribs 7 do not bear on the lateral flanks 13 of the pulley ribs 11 with the required contact pressure and optionally with the required contact area for the purpose of the transmission or zone.

It can be seen that it is immaterial for the functioning of the V-ribbed belt according to the invention, whether the first material 3 extends into the V-ribs 7 or, as is illustrated in an exemplary manner in the drawing, the V-ribs 7 are formed entirely from the second material. For the capability of identifying the removal of material in the rib base 9 it is only advantageous for the rib flanks 12 to be furthermore formed from the second material 6, that is to say appear black, for example, while the wear signal appears as a red stripe on the rib base 9, for example.

Accordingly, sizeable deviations in the proportions of the first material 3 and of the second material 6 in the underside 4 of the V-ribbed belt are possible. In the case of deformation in a molding method, the first material 3 may account for 5 to 95%, and the second material 6 thus for 95 to 5% of the material of the underside 4. In the case of manufacturing by a grinding method it is expedient for the proportion of the first material 3 to be 5 to 50%, and the proportion of the second material 6 to be 50 to 95% of the material of the underside 4.

While a color-based identification on the rib base has been referred to in the exemplary embodiment described, the method according to the invention is not limited thereto. The principle of the method according to the invention is based on using a removal of material on the rib base 9, and not on the rib flanks 12, as a signal for a wear state. It is self-evident that removal of material on the rib base 9 may also be established by way of usual material testing apparatuses, in particular furthermore when two different materials 3 and 6 are used, and only a thin layer of the second material 6 is used on the rib base 9. If and when the two materials display different behaviors, for example in response to ultrasonic rays or X-rays, the removal of material of the second material 6 may be readily detected in this manner.

The removal of material on the rib base 9 may furthermore be established also by way of distance measurement, for example by radar technology, using a simple radar sensor, wherein this sensor may be fixedly fitted in a plant. In this case, the spacing of the rib base 9 from the fixedly installed sensor may be monitored. Should the spacing by virtue of the removal of material be enlarged by a certain value, this signal may be utilized as an indicator for a wear state.

However, the embodiment described eliciting a visual and in particular color-based marking of the V-ribbed belt in the base of the groove does have the advantage that no monitoring sensor system is required, as the wear state is visually identifiable.

The invention claimed is:

1. A V-ribbed belt with wear state indicator, comprising:
a belt backing;
a tension strand disposed below the belt backing; and
an underside in which are configured V-ribs having oblique rib flanks which in a longitudinal direction of the V-ribbed belt run mutually parallel and which each have a mutual intermediate space configured for engagement of pulley ribs of a V-belt pulley between two V-ribs of the V-ribbed belt, wherein the intermediate space extends up to a rib base of the two V-ribs,
wherein the underside is composed of at least one first material and of at least one second material,
wherein the first material is covered by the second material,
wherein the first material has a first color and the second material has a second color that is visually identifiable as different from the first color,
wherein a thickness of the second material in a region of the rib flanks is larger than in a region of the rib base such that removal of the second material on the underside due to wear exposes the first material in the region of the rib base and makes visible the first color of the first material in the region of the rib base and the second color of the second material in the region of the rib flanks, and
wherein the first material forms a layer of the underside that adjoins the tension strand, wherein the layer extends into the V-ribs and configures a rib core which is covered by the second material, wherein a thin layer of the second material covers the first material in the region of the rib base and wherein a thick layer of the second material covers the rib flanks, and wherein said thick layer of the second material is thicker than said thin layer of the second material.

2. The V-ribbed belt as claimed in claim 1, wherein the color of the first material is black or gray and the color of the second material is red.

3. The V-ribbed belt as claimed in claim 1, wherein the color of the first material is red and the color of the second material is black or gray.

4. The V-ribbed belt as claimed in claim 1 wherein a thickness of the second material in a region of the rib base is between 0.1 and 2 mm.

5. The V-ribbed belt as claimed in claim 1, wherein the color of the first material or the second material is a fluorescent color.

* * * * *